RECEIVERS FOR PULSED FREQUENCY MODULATION CARRIER SYSTEMS

Filed Nov. 23, 1951 7 Sheets-Sheet 1

Inventor
C. W. EARP
By Philip M. Bolton
Attorney

Dec. 18, 1956 C. W. EARP 2,774,817

RECEIVERS FOR PULSED FREQUENCY MODULATION CARRIER SYSTEMS

Filed Nov. 23, 1951 7 Sheets-Sheet 2

Inventor
C.W. EARP
By Philip M. Bolton
Attorney

Dec. 18, 1956 C. W. EARP 2,774,817

RECEIVERS FOR PULSED FREQUENCY MODULATION CARRIER SYSTEMS

Filed Nov. 23, 1951 7 Sheets-Sheet 3

Inventor
C.W.EARP
By Philip M. Bolton
Attorney

Dec. 18, 1956 C. W. EARP 2,774,817

RECEIVERS FOR PULSED FREQUENCY MODULATION CARRIER SYSTEMS

Filed Nov. 23, 1951 7 Sheets-Sheet 4

Inventor
C.W. EARP
By Philip M. Bolton
Attorney.

RECEIVERS FOR PULSED FREQUENCY MODULATION CARRIER SYSTEMS

Filed Nov. 23, 1951 7 Sheets-Sheet 5

Inventor
C. W. EARP
By Philip M. Bolton
Attorney

Dec. 18, 1956 C. W. EARP 2,774,817

RECEIVERS FOR PULSED FREQUENCY MODULATION CARRIER SYSTEMS

Filed Nov. 23, 1951 7 Sheets-Sheet 6

Inventor
C. W. EARP
By Philip M. Bolton
Attorney

Dec. 18, 1956 C. W. EARP 2,774,817

RECEIVERS FOR PULSED FREQUENCY MODULATION CARRIER SYSTEMS

Filed Nov. 23, 1951 7 Sheets-Sheet 7

Inventor
C. W. EARP
By Philip M. Bolton
Attorney

United States Patent Office 2,774,817

Patented Dec. 18, 1956

2,774,817

RECEIVERS FOR PULSED FREQUENCY MODULATION CARRIER SYSTEMS

Charles William Earp, London, England, assignor to International Standard Electric Corporation, New York, N. Y., a corporation of Delaware Application November 23, 1951, Serial No. 257,809

Claims priority, application Great Britain December 1, 1950

13 Claims. (Cl. 179—15)

The present invention relates to receiving arrangements for electric signal communication systems of the pulsed frequency or phase modulation type.

In a well known radio communication system, a signal wave is represented by short pulses of frequency modulated carrier waves which are transmitted at regular intervals. Such a system is well adapted for multiplexing on a time division basis. The theoretical performance of this system as regards signal-to-noise ratio is known to be very high, as is pointed out, for example in a paper by C. W. Earp entitled "Relationship between rate of transmission of information, frequency bandwidth, and signal-to-noise ratio" in "Electrical Communication," June 1948, page 178. However, hitherto this high theoretical performance has not been realised in practice principally because the receiving arrangements generally employed were not capable of utilising the inherent properties of the system, and partly also because incorrect transmitting methods were used. Accordingly, the signal-to-noise ratio obtained with this type of system was not any better than that generally obtained with most of the other well known systems.

In the specification of co-pending application of Charles William Earp, Serial No. 257,807, filed November 23, 1951, there is described a system of communication in which a new principle is employed. The system is of the kind in which a signal wave is periodically sampled, and in which each sample is represented by a transmitted signal or group of signals (which may be of a variety of types), from which it is possible to derive two or more different quantities or indices each representing the same signal sample. These indices are used at the receiver to reconstitute the sample. This system resembles a code modulation system, since several signals are used to characterise each sample, but it differs therefrom in two fundamental respects, namely (1) The signal wave is not quantised, and (2) Each index represents one of a continuous series of values of the signal sample, and not only one of a limited number of values.

As a result, the distortion resulting from quantising, which is inherent in a code modulation system, does not occur in the new system referred to.

The feature by which the new system produces a great improvement in signal-to-noise ratio is this, namely that at least one of the indices represents the signal sample ambiguously (that is, any index represents more than one value of the signal sample), and the remaining indices (which may also be ambiguous) are used in the receiver to resolve the ambiguity.

The high theoretical performance of the pulsed frequency modulation system results from the fact that the pulses of frequency modulated waves carry with them an ambiguous quantity (namely the relative phase) which under proper conditions may represent a function of the signal wave, and the utility of this quantity has not previously been recognised. The signal wave has hitherto always been reconstituted by observing only the frequency of each wave pulse, which is an unambiguous parameter. Moreover, owing to the usual manner in which the wave pulses have been transmitted, the ambiguous index (namely the relative phase) does not represent the same function of the signal wave as the frequency. Furthermore, in a multi-channel system, because a single oscillator is commonly employed to serve all the channels, the phase index no longer represents uniquely a signal sample corresponding to any one channel, and therefore cannot be made use of at all.

It is pointed out in the specification already referred to, that when the transmitting arrangements are modified in a manner explained, the pulsed frequency modulation system becomes a special case of the new system described above, and receiving arrangements are also described, but not claimed, by means of which a significant improvement in signal-to-noise ratio can be obtained according to the new principle.

It is the chief object of the present specification therefore to claim such receiving arrangements independently of the system claimed in the specification already referred to.

It has already been stated that in a single channel pulsed frequency modulation system of the conventional type, the ambiguous phase index and the frequency index do not represent the same function of the signal wave. With certain types of signal (including speech signals) the high-frequency energy content of the signal band is comparatively small, and so the distortion resulting from the use of these two different indices may not be serious, while with suitable receiving arrangements a large improvement in signal-to-noise ratio can be obtained.

Another object of the invention, therefore, is to apply the same receiving principles to a pulsed frequency modulation system of the conventional type, in order to secure an improvement in signal-to-noise ratio.

In the specification already referred to an embodiment is described in which each index signal comprises trains or packets of phase modulated waves of constant frequency. A further object of the present invention, therefore, is to apply the same receiving principles to this type of system also.

These objects are achieved according to the invention by providing a receiving arrangement for an electric communication system of the kind in which a signal wave is periodically sampled, and in which each signal sample is represented by one or more transmitted wave pulses of phase- or frequency-modulated waves, comprising means for producing a plurality of wave trains by selecting each received wave pulse, and/or one or more portions of each received wave pulse, means for combining two of the said trains which are differently phased in order to produce a wave packet having a phase determined by the difference between the phases of the waves of the respective combined trains, and means for employing two such wave packets for reproducing a sample of the signal wave.

In this specification, the "phase" of a wave is used as an index. It will be understood, of course, that this phase must always be referred to some "standard" of phase; in the case of a pulse or packet of waves this standard is the phase of a preceding pulse or packet.

The invention will be described with reference to the accompanying drawings, in which.

Figures 1, 3:
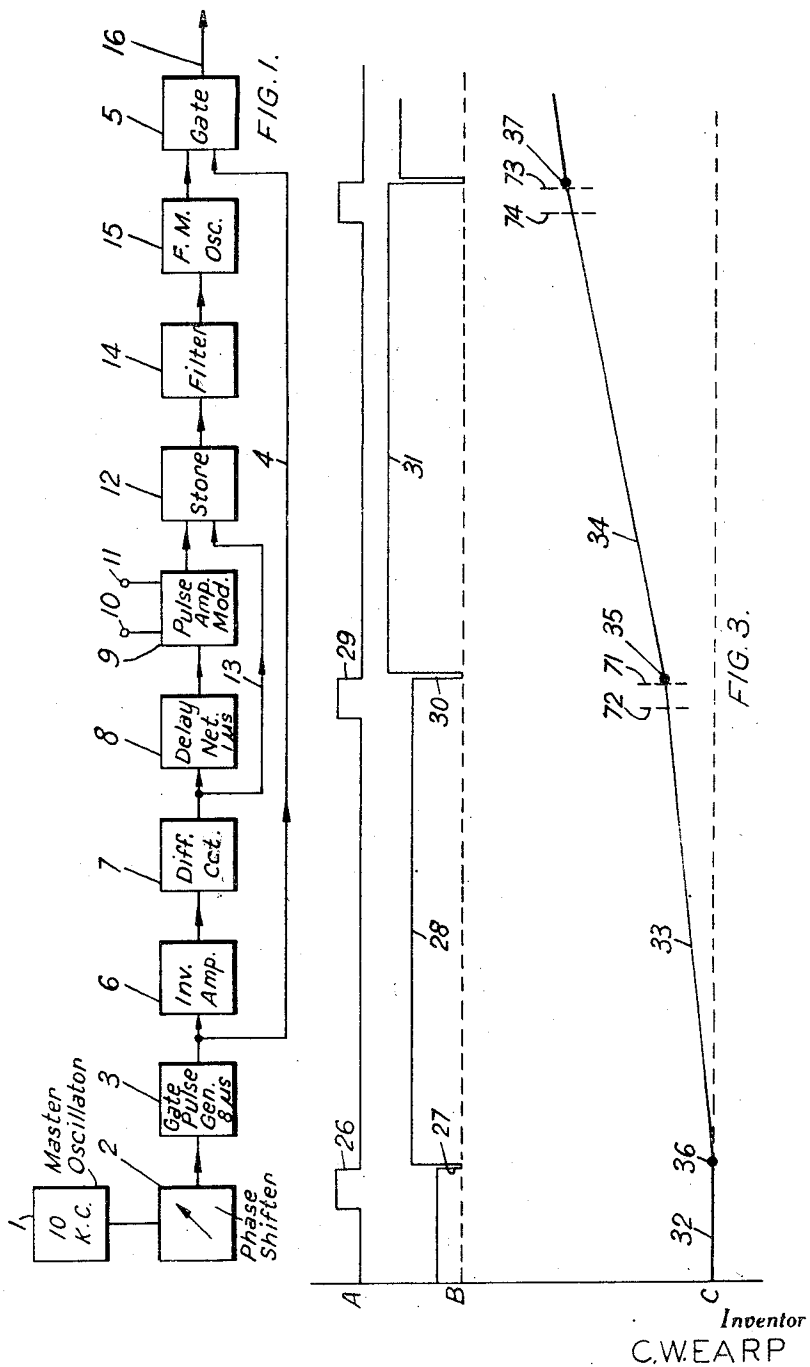
Fig. 1 shows a block schematic circuit diagram of a transmitter for a pulsed frequency modulation communication system in which a receiver operating according to the principles of the invention may be used.
Fig. 3 shows graphical diagrams used to explain the operation of systems in which the invention may be employed.

The first embodiment of the present invention comprises a receiving arrangement for a pulsed frequency modulation system in which the transmitter has been modified in accordance with the principles set forth in the specification of co-pending application of Charles William Earp, Serial No. 257,807, filed November 23, 1951, already referred to. In order that the embodiment may be understood, it will be necessary to describe this special transmitter, but no claim is made in the present specification to any transmitting arrangements.

It will be assumed that the system will provide 12 communication channels multiplexed on a time-division basis, in which the sampling frequency at the transmitting end is 10,000 times per second. The sampling period is thus 100 microseconds, which allows 8 microseconds for the wave pulses of each channel with a synchronising period of 4 microseconds, during which a synchronising signal may be transmitted to control the channel selection process at the receiver. Alternatively, a 4 microseconds gap may be left in the transmitter wave, and a simple rectifier in the receiver can be used to derive a synchronising pulse from the gap.

In the pulsed frequency modulation system as hitherto practised, the signal wave is usually applied to frequency-modulate an oscillator, and the frequency modulated waves are then passed through a gate circuit which only allows very short pulses of the frequency modulated waves to pass. In this case the instantaneous frequency of the waves constituting each pulse represents unambiguously the amplitude of the corresponding sample of the signal wave, and is utilised in the receiver to reproduce the signal wave. There is also a definite relation between the relative phase of the waves in successive pulses and the variations of the signal amplitude. Since in the period between two pulses the frequency of the oscillator is continuously changing in accordance with the changes in the signal amplitude, the phase difference between two pulses is proportional to the time integral of the signal amplitude taken over the intervening period.

If therefore an attempt is made to utilise the relative phase as an ambiguous index in this system, distortion will be introduced because the other index, namely the frequency, which would be used to resolve the ambiguity, represents a different function of the signal wave, namely the actual amplitude of the sample. In certain special cases the distortion introduced by this process may not be excessive, and a receiver will be described below for making use of these two indices which are available in the conventional system.

As described with reference to Fig. 15 of the specification referred to above, the transmitting arrangements of the pulsed frequency modulation system are modified in such manner that both the frequency and the relative phase of the waves constituting each pulse represent the same function (namely the amplitude) of the same sample of the signal wave. The use of these two indices at the receiver according to the present invention then enables the signal amplitude samples to be reproduced without distortion.

When the conventional pulsed frequency modulation system is applied to multichannel working, it is usual to gate each signal wave, and to apply amplitude samples of the various signal waves in turn to frequency-modulate an oscillator common to all channels. If this is done, then the relative phase of the waves constituting any transmitted pulse has no unique relation to the corresponding signal wave, since this phase depends on the frequencies corresponding to all the other channel samples. In this case the relative phase cannot be used at all as an ambiguous index. For this to be possible it is necessary that a separate oscillator be provided for each channel, and then the relative phase can be used to characterise the signal wave. It follows, therefore, that in a multichannel system employing a receiver according to the present invention, a separate oscillator will be used for each channel.

Fig. 1 shows in block schematic form a transmitter circuit for a single channel of a 12-channel pulsed frequency modulation system. It is the same as Fig. 15 of the specification just referred to. A master oscillator 1 generates the sampling frequency of 10 kilocycles per second, and supplies waves through a phase shifter 2 to a gating pulse generator 3 which generates positive gating pulses of duration 8 microseconds. These pulses are supplied over conductor 4 to a gating circuit 5 to which the frequency modulated waves are also applied, as will be explained later. The gating pulses from the generator 3 are also passed through an inverting amplifier 6 to a differentiating circuit 7 which produces short negative and positive differentiated pulses corresponding respectively to the leading and trailing edges of the gating pulses. The differentiating circuit will be assumed to include conventional means for eliminating the negative pulses, which are not required.

The positive pulses are applied through a delay network 8, which introduces a delay of about 1 microsecond, to a conventional pulse amplitude modulator 9 to which the signal wave is applied at terminals 10 and 11. The amplitude modulated pulses produced by the modulator 9 are applied to a storage circuit 12, the nature of which will be explained later. The positive differential pulses from the differentiating circuit 7 are also applied directly to the storage circuit 12 over conductor 13. The storage circuit 12 is followed by a low pass filter 14, at the output of which stepped rectangular waves are produced, the amplitude after each step being proportional to the amplitude of a corresponding sample of the signal wave. These stepped waves are applied to frequency-modulate by conventional means an oscillator 15 generating waves of a frequency suitable for radiation. The frequency modulated waves from the output of the oscillator 15 are gated by the gating circuit 5, and corresponding pulses of frequency modulated waves are delivered to the output conductor 16 and thence to the radio transmitter (not shown).

The elements 2 to 15 are duplicated for each channel of the system, the duplicated apparatus for each channel being connected between the output of the master oscillator 1 and the conductor 16.

The phase shifters 2 of the various channels should be adjusted to align the corresponding gating pulses side-by-side in the sampling period, thereby producing a substantially continuous wave occupying 96 microseconds thereof, leaving a 4 microsecond gap which can be used as the synchronising signal as already explained above.

Figure 2:
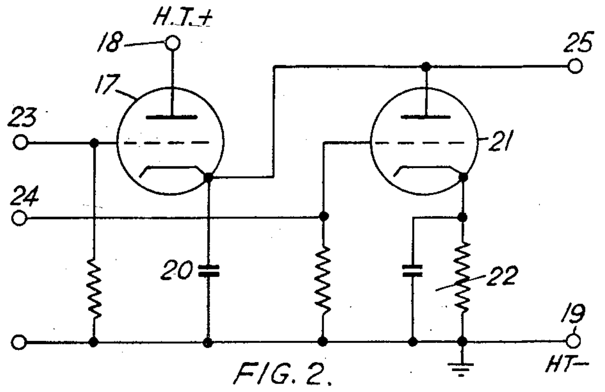
Fig. 2 shows details of an element of Fig. 1.

Fig. 2 shows details of the storage circuit 12 of Fig. 1. A valve 17 is arranged as a cathode follower with its anode connected to the positive high tension terminal 18, and its cathode connected to the grounded negative high tension terminal 19 through a storage capacitor 20. A discharging valve 21 having a cathode bias network 22 is connected across the storage capacitor 20. This valve should be biassed beyond the cut-off. The positive amplitude modulated pulses from the modulator 9, Fig. 1, are applied through the input terminal 23 to the control grid of valve 17, and the undelayed positive pulses from the differentiating circuit 7, Fig. 1, are applied through the input terminal 24 to the control grid of the discharging valve 21. The anode of this valve is connected to a terminal 25 from which the output wave is obtained and is applied through the filter 14, Fig. 1, to the oscillator 15.

The circuit operates in the following way. A short pulse applied at terminal 24, Fig. 2, first unblocks the valve 21 and discharges the storage capacitor 20. About one microsecond afterwards an amplitude modulated pulse arrives at terminal 23 and charges the capacitor 20 positively to a potential proportional to the amplitude of the pulse. The capacitor 20 then holds its charge for 99 microseconds until the next discharging pulse arrives at terminal 24. One microsecond later it is discharged to a potential proportional to the next amplitude modulated pulse, and so on. The wave obtained at the output terminal 25 therefore has the form shown in Fig. 3, graph B, consisting of long rectangular pulses separated by very short gaps, which are removed by the filter 14, to produce the stepped rectangular wave.

In Fig. 3, graph A represents to a horizontal time scale the gating pulses of 8 microseconds duration produced by the gating pulse generator 3 of Fig. 1. These pulses are repeated at intervals of 100 microseconds. Graph B shows the corresponding variations in the potential of the storage capacitor 20 (Fig. 2) to the same time scale. When the trailing edge of the gating pulse 26 arrives, the storage capacitor is immediately discharged, as indicated at 27, and 1 microsecond later is charged to the potential 28 corresponding to the amplitude modulated pulse, which is delayed by this amount after the trailing edge of the gating pulse. When the next gating pulse 29 arrives, the capacitor is again discharged at 30, and is then recharged to a new value 31, and so on. It will be clear that graph B also represents the variation in frequency of the oscillator 15 (Fig. 1), except for the 1 microsecond gaps, which are removed by the filter 14. Thus it will be seen that the frequency of the oscillator remains constant substantially for the whole of the 100 microsecond period between the trailing edges of successive gating pulses, there being practically a sudden change at each trailing edge.

Graph C in Fig. 3 shows to the same time scale the phase of the waves generated by the oscillator 15 with reference to the phase of waves having the mean frequency. It is assumed that previous to the gating pulse 26 the oscillator frequency has the mean value, in which case the phase has the zero or reference value, as indicated by the portion 32 of the curve. After the occurrence of the trailing edge of the pulse 26 (graph A), the frequency suddenly changes to the higher value represented by 28, and the phase then starts to advance steadily as indicated by the inclined straight line 33. On the occurrence of the pulse 29 there is a further increase in frequency as indicated by 31, and the phase then advances more rapidly, as indicated by the steeper straight line 34. It will be evident that since the frequency of the oscillator is held constant between gating pulses, measurement of the phase change during any interval lying between the trailing edges of gating pulses 26 and 29 will give a measure of the amplitude of the signal sample which frequency-modulates the oscillator 15 (Fig. 1) to the frequency indicated on graph B by the line 28. If this interval is so short that the phase change is less than 180°, an unambiguous measurement of coarse accuracy is obtained, while if the interval is long, for example extending over the whole of a sampling period, so that the phase change embraces several cycles, a measurement of higher inherent accuracy is obtainable, but is ambiguous. It will therefore, be appreciated that if the frequency characterising the wave pulse passed by the gating pulse (29, for instance) is measured twice over at the receiver, once by measurement of the phase change over a short interval and again by measurement of the phase change over a relatively long interval (covering several cycles), two indices representing the signal amplitude at the time of the trailing edge of the gating pulse 26 will be obtained, and can be used to reconstitute the signal amplitude according to the principles already explained.

Figure 4:
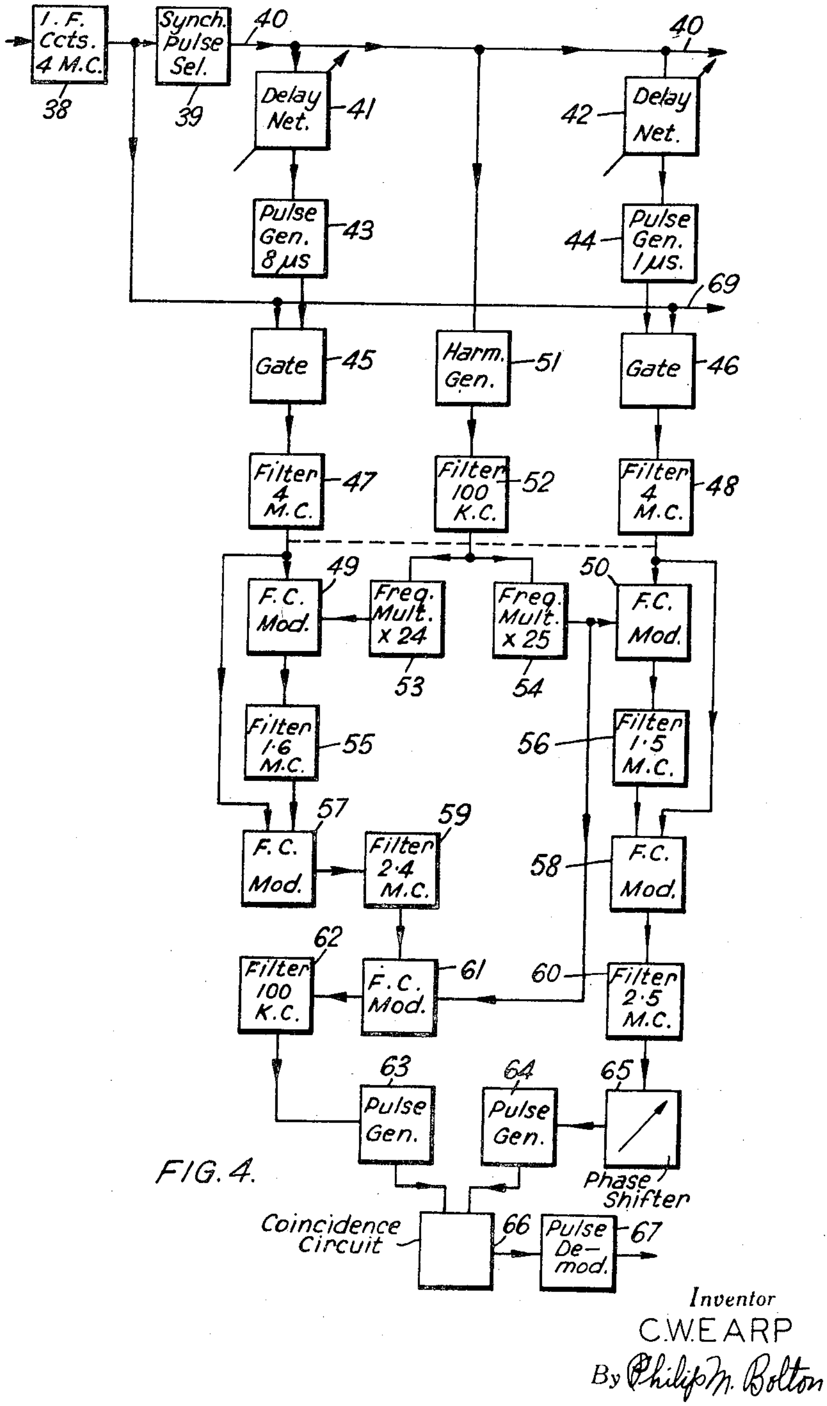
Figs. 4 and 5 show block schematic circuit diagrams of two alternative receivers, according to the invention, for the system of Fig. 1.

One form of receiver according to the invention, for this system is shown in Fig. 4. The first or unambiguous index is the frequency of each wave pulse and this is measured in the circuit of Fig. 4 by comparing the phases of two samples of the wave pulse spaced apart in time by 4 microseconds. The ambiguous index is the phase change, and is measured by comparing the phases of two samples spaced apart by 100 microseconds, and taken respectively from the ends of successive wave pulses.

The wave pulses are received by a conventional receiver the only part of which shown in Fig. 4 is the intermediate frequency circuits indicated by the block 38. It will be assumed, for example, that the intermediate frequency is 4 megacycles per second, but any other suitable frequency could be used. The intermediate frequency waves are applied to a synchronising pulse selector 39, which may comprise a simple rectifier circuit producing a synchronising pulse in response to each 4 microseconds gap in the wave. These synchronising pulses are applied over conductor 40 and thence through adjustable delay networks 41 and 42 to corresponding gating pulse generators 43 and 44. The gating pulses from these generators are supplied respectively to two conventional gating circuits 45 and 46 to which the intermediate frequency waves from the block 38 are also supplied. The pulse generator 43 should be designed in any convenient way to produce a gating pulse of 8 microseconds duration in response to each synchronising pulse, and the delay network 41 should be adjusted so that the wave pulse corresponding to the channel concerned is selected by the gate circuit 45. The frequency will ultimately be determined from this wave pulse.

The pulse generator 44 should be designed to produce shorter gating pulses of duration perhaps 1 microsecond. The delay network 42 should be adjusted so that the gating circuit 46 will select a short sample from the wave pulse selected by the gate circuit 45, as near as possible to the trailing edge of the pulse. The ambiguous phase change will subsequently be determined from these short samples.

The waves selected by the gating circuits 45 and 46 are supplied through band pass filters 47 and 48 tuned to 4 megacycles per second to corresponding frequency changing amplitude modulators 49 and 50. Unmodulated heterodyne waves for these modulators are obtained by means of a harmonic generator 51 connected to the output of the synchronising pulse selector 40, and operated by the selected synchronising pulses. The tenth harmonic (at 100 kilocycles per second) of the sampling frequency (10 kilocycles per second) is selected by the filter 52, and is supplied to two frequency multipliers 53 and 54, which should be designed to multiply by 24 and 25 respectively, thereby producing heterodyne waves of 2.4 and 2.5 megacycles, respectively, for the modulators 49 and 50. The filters 55 and 56 should be designed to select the lower sidebands of 1.6 and 1.5 megacycles, respectively, which are passed to a second pair of frequency changing amplitude modulators 57 and 58. These modulators are also supplied with waves at 4 megacycles from the filters 47 and 48 respectively, and the filters 59 and 60 should be designed to select the lower sidebands at 2.4 and 2.5 megacycles, respectively.

The filter 55 should be designed to introduce a delay of 4 microseconds, so that the waves selected by the filter 59 will have a phase determined by the phase-shift during 4 microseconds of the wave pulse, and therefore proportional to the frequency of each wave pulse.

The filter 56 should however be designed to introduce the much longer delay of 100 microseconds, so that the phase of the waves selected by the filter 60 will be equal to the change of phase between successive wave pulses, Since the wave pulses selected by the gating circuits are too short for the subsequent process, it is necessary to choose the bandwidth of the filters 59 and 60 sufficiently small so that they elongate the wave trains or packets of the wave pulses to a duration of about 50 microseconds.

A third frequency changing amplitude modulator 61 is provided for the waves selected by the filter 59. This modulator is supplied with heterodyne waves at a frequency of 2.5 megacycles per second from the output of the frequency multiplier 54. The lower sideband at 100 kilocycles per second is selected by the filter 62.

The wave trains or packets at frequencies of 100 kilocycles per second and 2.5 megacycles per second, respectively, obtained from the filters 62 and 60 are applied to pulse generators 63 and 64 each of which produces a comb of pulses having a repetition period equal to the period of the waves from which the comb was derived. An adjustable phase shifter 65 is interposed between the elements 60 and 64. These combs are applied to a coincidence circuit 66 which produces an output pulse when it receives simultaneously one pulse from each comb, the time position of the output pulse being determined by the amplitude of the signal sample which produced the wave pulse accepted by the gating circuit 45.

The position modulated output pulses are passed to a pulse demodulator 67 by which the signal wave is recovered in conventional manner.

The technique by which the coincidences of two or more pulse combs are employed to recover the signal wave is described in detail in the specification of copending application of Charles William Earp, Serial No. 257,807, filed November 23, 1951, already referred to, and also forms the subject of copending application of Charles William Earp, Serial No. 257,808, filed November 23, 1951. This technique is only incidental to the present invention, and further information may be obtained by consulting these specifications.

It will however be explained here that the pulses forming the comb produced by the generator 64 are spaced apart by 0.4 microsecond and as the phase difference between successive received wave pulses varies in the manner illustrated in Fig. 3, graph C, the comb shifts in time in a corresponding manner. The ambiguity results from the fact that the time position of one of its pulses represents the signal sample, but in the absence of any other indication it is not known which pulse this is. The ambiguity is resolved by the use of the other pulse comb produced by the generator 63 which is derived from a different index (namely the frequency) and this comb has a pulse spacing of 10 microseconds, and the time position of one of its pulses also represents the signal sample unambiguously. This pulse is used as a gating pulse to enable the coincidence circuit 66 to pick out the proper pulse of the other comb.

The improvement in signal-to-noise ratio produced by this arrangement may be explained in the following way. The comb produced by the generator 63 is derived from the phase modulated wave at the output of the filter 59 the phase shift of which is less than $\pm\pi$ radians and represents the frequency of the wave pulse, and therefore the signal sample, without any ambiguity. By selecting one of the pulses from the comb, the signal could be reproduced with a signal-to-noise ratio having a moderate value characteristic of the conventional pulsed frequency modulation system. The frequency change produced by the modulator 61 has multiplied the envelope time shift of the wave 24 times but has also multiplied the noise by the same factor, and so has not altered the signal-to-noise ratio. However, the comb produced by the generator 64 is derived from a phase modulated wave the phase shift of which is many times $\pm\pi$ radians and therefore represents the signal sample ambiguously. However it carries the same noise as the wave at the output of the filter 59. The particular pulse of this comb which represents the signal amplitude is picked out by a pulse of the other comb, and provided that this latter pulse is of sufficient duration, the high noise which is carried will not be transferred to the selected pulse. The output pulse therefore has a time shift corresponding to a very large phase excursion, and so the signal-to-noise ratio is increased in proportion.

It is necessary to point out that the envelope time shifts of the phase modulated waves from which the combs are derived must be equal. By envelope time shift we mean the maximum time shift of some characteristic point, such as a zero point, of the wave. The envelope time shift is equal to the phase shift divided by the frequency. Since the phase shift which occurs in 100 microseconds is 25 times that which occurs in 4 microseconds, it is necessary for the frequencies from which the combs are derived to be in the ratio 25:1 in order that the envelope time shifts may be the same. This is achieved by the extra modulator 61 which changes the frequency down to 100 kilocycles per second.

The pulses of the comb produced by the generator 64 should be very short, for example 0.02 microseconds, while, as already stated, those of the other comb should be much longer, for example 0.2 microseconds. The phase shifter 65 should be adjusted so that when the modulating signal voltage at the transmitter is zero, a pulse near the centre of the comb produced by the generator 64 is selected by the coincidence circuit 66.

If the frequency deviation which can occur between any two waves pulses is small, which may be the case with certain types of signal, the circuit of Fig. 4 may be slightly simplified by eliminating the elements 42, 44, 46 and 48, and by making a direct connection indicated by the dotted line 68 between the output of the filter 47 and the inputs of the modulators 50 and 58. In this case two successive complete wave packets of duration 8 microseconds are compared by the modulator 58, instead of only a small portion of each, and this will be possible so long as the differential phase does not change appreciably during the 8 microseconds period. If there should be an appreciable change, however, the filter 60 would not pass these phase variations, and an amplitude variation at the output of this filter would result.

Fig. 4 shows only the apparatus for one channel. For each additional channel all the elements 41 to 67 would be duplicated and the duplicated elements would be connected in the same manner between conductors 40 and 69. If desired, the harmonic generator 51 could be omitted and the filter 52 could be replaced by an oscillator generating 100 kilocycles per second.

In the receiver shown in Fig. 4, the circuit was designed according to the conception that the two indices representing the signal wave sample are frequency and phase. Actually, the transmission of the signal by the method described with reference to Fig. 1 can be regarded from other points of view, and in the preferred form of receiver according to the invention shown in Fig. 5 the two indices which are used to represent each signal sample are both ambiguous. The method adopted is as follows. Assuming that the wave pulses are transmitted as described with reference to Fig. 1, then at the receiver two short samples are taken, one from near the beginning, and one from near the end of each wave packet, which has a total duration of 8 microseconds. Then the first index is obtained as the phase shift between the "early" sample of each pulse and the "late" sample of the preceding pulse; and the second index is obtained as the phase shift between the "late" sample of each pulse and the "late" sample of the preceding pulse.

Figure 5:
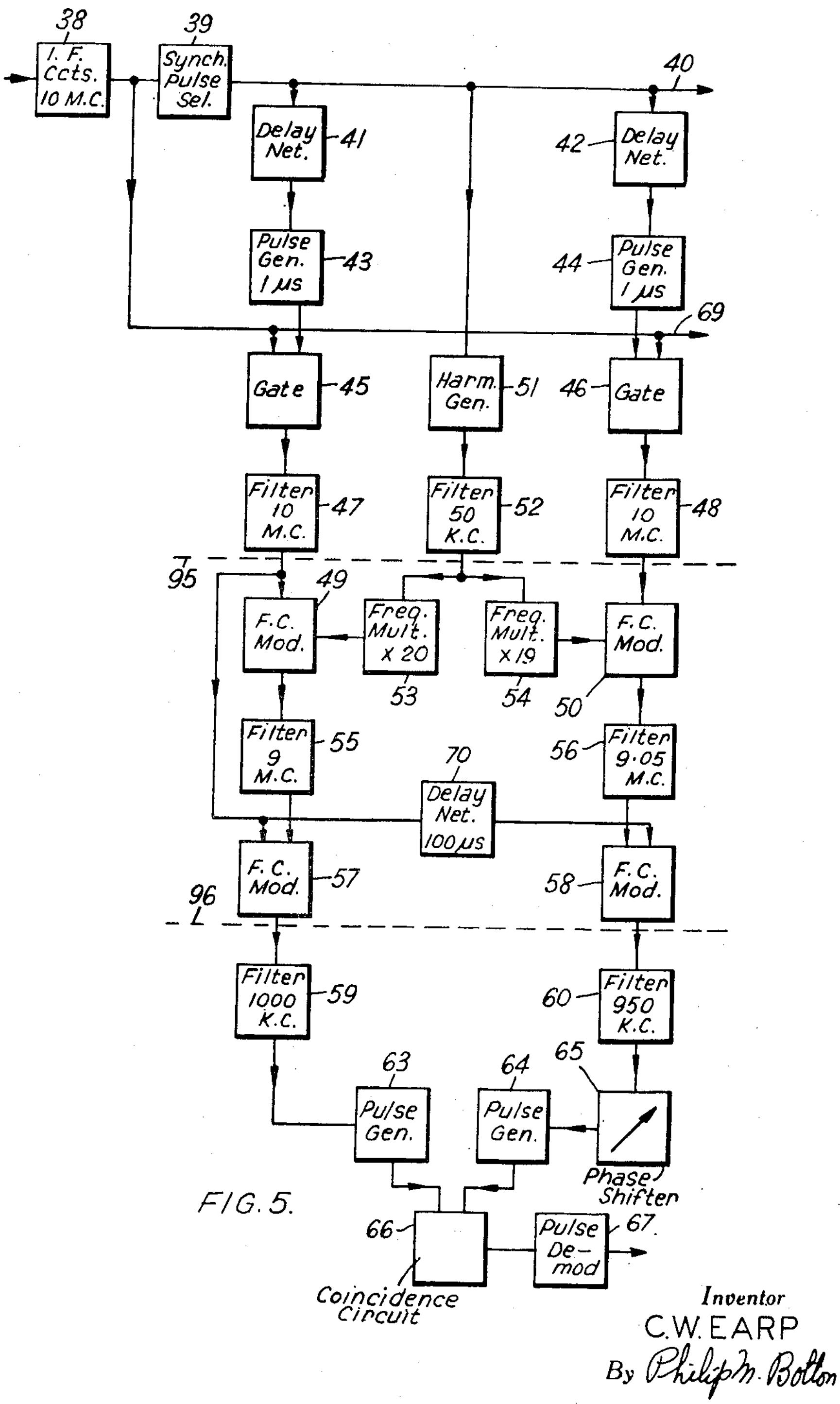

Referring now to Fig. 5, this will be found to be a modification of Fig. 4, and many of the elements are the same, and have been given the same designation numbers. Also a different choice of values is suggested. The modulator 58 is supplied from the output of the filter 47 through a delay network 70 instead of from the output of the filter 48; thus the filter 47 supplies both the modulators 57 and 58.

The elements 61 and 62 have been omitted, as the third frequency change is not required, and the filter 59 is connected directly to the pulse generator 63.

It will be assumed in this case that the intermediate frequency circuits 38 are designed for a frequency of 10 megacycles per second. The gating pulse generators 43 and 44 should be designed to generate gating pulses of duration about 1 microsecond. The delay network 41 should be adjusted so that the gating circuit 45 selects a "late" sample of each 8 microsecond wave pulse corresponding to the channel concerned; for example the sample could be during the 7th microsecond of this period. The delay network 42 should likewise be adjusted so that the gating circuit 46 selects an "early" sample; for example during the 2nd microsecond of the 8 microsecond period. Two successive pairs of such samplings are shown in graph C of Fig. 3 at the times indicated by the dotted lines 71, 72, 73, 74.

The filters 47 and 48 should be designed for 10 megacycles per second and should also produce some elongation of the 1 microsecond wave samples.

The filter 52 should be arranged to select the fifth harmonic at 50 kilocycles per second from the harmonic generator 51, and the frequency multipliers 53 and 54 should be designed to multiply by 20 and 19 respectively. The filters 55 and 56 should be designated to select the lower sidebands at 9 and 9.05 megacycles per second, respectively, from the modulators 49 and 50. The filters 59 and 60 should also be designed to select the lower sidebands at 1000 and 950 kilocycles per second respectively from the modulators 57 and 58. These filters should also elongate the wave packets to a duration of at least 20 microseconds. The pulse generators 63 and 64 then produce corresponding pulse combs with pulse repetition frequencies of 1000 and 950 kilocycles respectively, in which the coincidence period is 20 microseconds, and which are treated by the elements 66 and 67 as before.

The filter 55 should be designed to introduce a delay of 100 microseconds, so that the "late" sample 71 (graph C, Fig. 3) may be combined with the "late" sample 73 of the following wave pulse in the modulator 57. Then the delay network 70 should be designed to introduce a delay of 100 microseconds to delay the "late" sample 71 so that it reaches the modulator 58 at the time that the sample 73 is selected by the gating circuit 46. Then the filter 56 should be designed to introduce a delay of 5 microseconds to bring the "early" sample 74 applied to the modulator 58 into coincidence with the delayed "late" sample 71.

It will be seen that the packet of waves at the output of the modulator 57 will be phased in accordance with the phase difference between the samples 73 and 71 (graph C, Fig. 3), while the packet at the output of the modulator 56 will be phased in accordance with the phase difference between the samples 74 and 71. These packets will occur simultaneously and correspond respectively to two ambiguous indices both of which represent the frequency at the time of the trailing edge of the gating pulse 29 (graph A, Fig. 3).

By choice of the frequencies 1000 and 950 kilocycles, which are in the same ratio as the periods separating the samplings 73 and 74 and the sampling 71, the two sets of waves from which the two combs are respectively produced by the pulse generators 63 and 64 will have the same envelope time shift, and so the additional frequency change employed in Fig. 4 is not required.

In the present case, the two pulse combs generated by the elements 63 and 64 have pulse repetition periods of 1 microsecond and about 1.053 microseconds, respectively. The duration of the pulses of both combs should preferably be about 0.03 microseconds. In this case both combs represent the signal ambiguously, and the signal amplitude is determined unambiguously by the coincidence of one pulse from each comb, which produces at the output of the coincidence circuit 66 an output pulse whose time position represents the signal sample, as before.

It was stated above that in certain cases, the principles of the invention could be applied to receiving wave pulses produced by a pulsed frequency modulation system transmitter of the conventional type, in which the ambiguous phase index represents a different function of the original wave from the frequency index.

Figure 6:
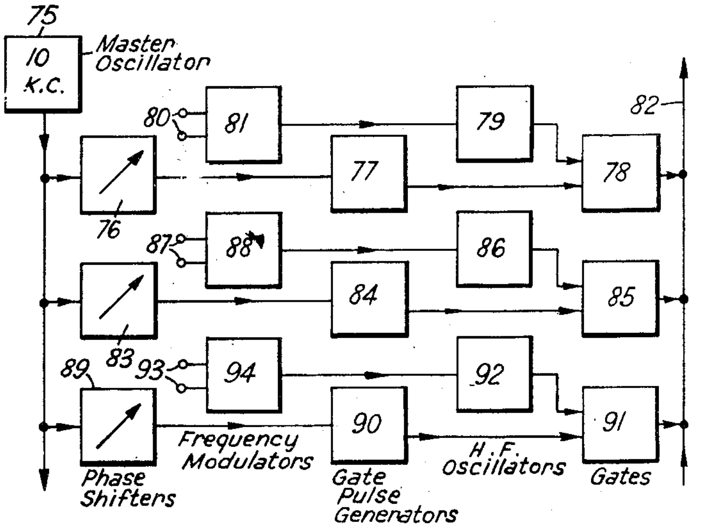
Fig. 6 shows a block schematic circuit diagram of a transmitter for another form of the pulsed frequency modulation system.

Fig. 6 shows a transmitter circuit for a multichannel system of this kind. Apparatus for three channels only is shown, and it can obviously be duplicated for any number of additional channels. A twelve-channel system will be assumed, as before, with a sampling rate of 10,000 times per second.

The master oscillator 75 supplies waves at 10 kilocycles per second through a phase shifter 76 to a gating pulse generator 77 designed to produce a train of gating pulses of 8 microseconds duration, in any conventional way. These gating pulses are applied to open a gating circuit 78 for gating the output of a high frequency oscillator 79, the frequency of which is modulated in a conventional manner by a signal wave applied at the input terminal 80 of a reactance valve or other frequency modulating circuit 81. The 8 microsecond wave pulses are supplied to an output conductor 82 leading to a radio transmitter (not shown) or other communication apparatus or circuit.

The elements 76 to 81 inclusive are provided for channel 1; similar elements 83 to 88, respectively corresponding to 76 to 81, are provided for channel 2; and elements 89 to 94 for channel 3. Apparatus (not shown) for the remaining channels will be similar.

The oscillators 79, 86, 92 etc. should preferably be adjusted to the same frequency, and the phase shifters 76, 83, 89 etc. should be adjusted to align all the 8 microsecond gating pulses side-by-side in the sampling period of 100 microseconds, leaving a synchronising gap of 4 microseconds at the end of each period.

The chief difference between Fig. 6 and the conventional arrangement is that a separate high frequency oscillator is provided for each channel. It is usual to employ a single oscillator and to gate the signal waves at the input to the oscillator. In the case of the present invention it is essential to provide a separate oscillator for each channel, for reasons which have already been explained. It will be clear that an uninterrupted succession of 12 wave pulses each of 8 microseconds duration, corresponding respectively to the channels of the system, followed by a 4 microseconds synchronising gap, will be delivered to the conductor 82 during each sampling period of 100 microseconds.

Figure 7:
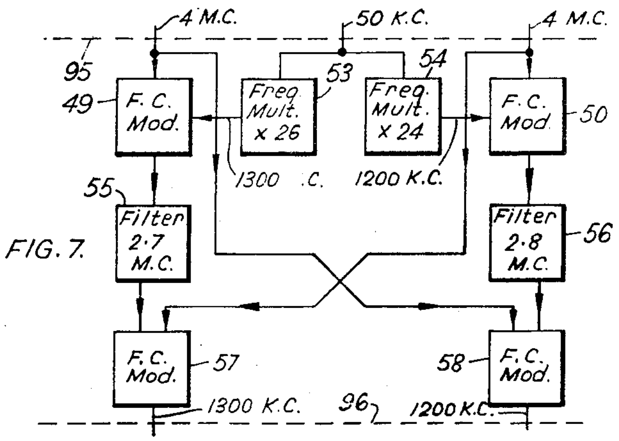
Fig. 7 shows a modification of the receiver of Fig. 5 to adapt it for use in the system of Fig. 6.

In the case of one form of receiver according to the present invention, for this system, a slight modification of Fig. 5 may be employed. This modification is indicated in Fig. 7, which shows the changes of that part of the circuit between the dotted lines 95 and 96 of Fig. 5, the remainder of the circuit being unaltered. In Fig. 7 the delay network 70 has been omitted, and there is a pair of cross-connections whereby the modulators 57 and 58 are supplied with wave pulses from the inputs of modulators 50 and 49 respectively; that is, each of the modulators 57 and 58 is supplied from the opposite side of the circuit.

In the present case it will be assumed that the intermediate frequency circuits 38 (Fig. 5) are designed for 4 megacycles per second. The elements shown in Fig. 7 will be the same as the corresponding elements of Fig. 5 except that they will be designed for different frequencies as indicated.

The operation of the receiver as modified according to Fig. 7 will be explained with reference to graph C, Fig. 3. This graph approximately represents the phase changes which occur in the waves generated by one of the oscillators such as 79 of Fig. 6. Since the oscillator frequency changes continuously in accordance with the variations in amplitude of the signal wave, the corresponding phase curve will consist of a continuous curved line, and not of a number of straight portions meeting at definite angles. It is probably sufficiently accurate to suppose that the lines 33 and 34 are chords of the actual phase curve.

It will be assumed that the gating pulse generators 43 and 44 of Fig. 5 now produce gating pulses of 2 microseconds duration; and the delay networks 41 and 42 should then be adjusted so that the gating circuits 45 and 46 select samples of the channel wave pulse the leading edges of which are respectively 6 and 2 microseconds after the leading edge of the corresponding wave pulse. These will be respectively the "late" and "early" samples of the wave pulse. The filters 47 and 48 should in this case be tuned to 4 megacycles per second, and should preferably be designed to elongate the wave packets selected by the gating circuits to a duration of about 10 microseconds.

The centre lines of the "late" and "early" samples are indicated respectively by the dotted lines 71, 72 in Fig. 3 for one wave pulse, and by 73, 74 for the successive wave pulse.

It will be clear that the "early" sample 74 is 96 microseconds later than the "late" sample 71, while the "late" sample 73 is 104 microseconds later than the "early" sample 72. Thus the filters 55 and 56 shown in Fig. 7 should be designed to introduce a delay of 104 and 96 microseconds, respectively. Then the wave packets at the output of the modulator 57 will bear a phase equal to the phase change of the output of the oscillator 79 (Fig. 6) which occurs in 104 microseconds, while the wave packets at the output of the modulator 58 (Fig. 7) will bear a phase equal to the phase change which occurs in 96 microseconds. These wave packets are the two ambiguous indices from which a sample of the signal amplitude is reconstructed. Since these phases will be approximately in the ratio 13:12, it is necessary that the wave packets at the outputs of the modulators 57 and 58 should have frequencies in the same ratio in order that the envelope time shifts should be the same. Accordingly frequencies of 1300 and 1200 kilocycles per second will be chosen for these frequencies, and so the frequency multipliers 53 and 54 should be designed to multiply by 26 and 24, respectively, assuming that the filter 52 (Fig. 5) selects the fifth harmonic at 50 kilocycles per second, as before. Then the filters 55 and 56 (Fig. 7) should be tuned respectively to select the lower sidebands at 2.7 and 2.8 megacycles per second, respectively, from the modulators 49 and 50. Also the filters 59 and 60 in Fig. 5 should now be designed to select the sidebands at 1300 and 1200 kilocycles per second, respectively, from the modulators 57 and 58.

The production of the pulse combs and the subsequent demodulation of the output pulses then takes place in the same way as described with reference to Fig. 5.

It should be pointed out that since in this case the phase indicated by graph C, Fig. 3 does not follow the straight lines shown, the two indices will represent slightly different functions of the signal wave, and each of these only approximately represents the frequency of one of the wave pulses. However, if the energy of the modulating signal wave resides mainly on the lower frequencies of the band (as in speech signals) the departure of the phase curve from straight lines is small and the resulting distortion will be negligible. The advantage as to signal-to-noise ratio will however be obtained, according to the invention.

Figure 8:
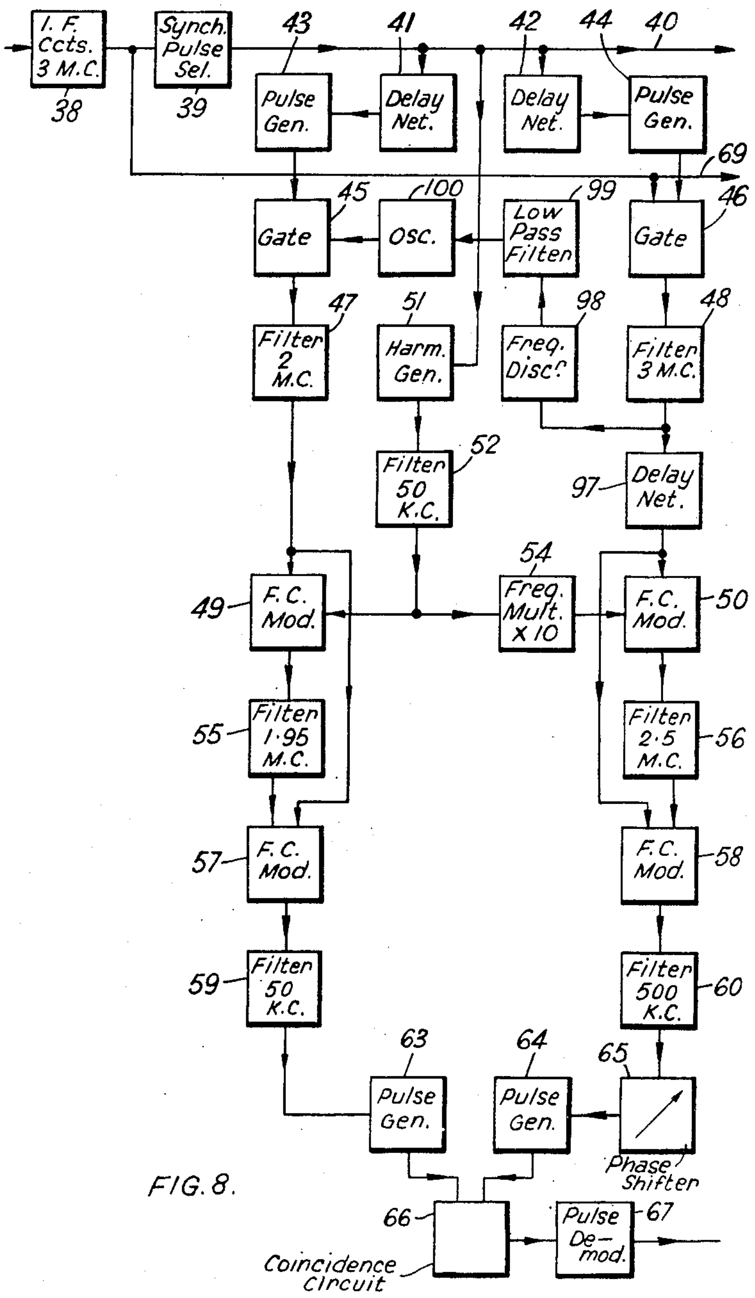
Fig. 8 shows a block schematic circuit diagram of a preferred receiver according to the invention for the system of Fig. 6.

Fig. 8 shows an alternative form of a receiver according to the invention, for the wave pulses produced by the circuit shown in Fig. 6. The first index is in this case unambiguous, and is obtained by demodulating the received wave pulses in the conventional way to reproduce the signal wave, and by frequency modulating a local oscillator with a small deviation by the recovered wave. Samples are then taken from the output of the local oscillator, which are treated in much the same way as the first index samples in Fig. 5 as modified by Fig. 7. Such samples will, of course, be accompanied by relatively high noise, and as in the case of the receiver, Fig. 4, this high noise is prevented from affecting the output pulses by lengthening the pulses of the corresponding comb. Many of the elements of Fig. 8 are the same as corresponding elements in Fig. 5 and have been given the same designation numbers.

The pulse generators 43 and 44 should be designed to produce gating pulses of, say 2 microseconds duration. The delay network 42 should be adjusted so that the gating circuit 46 selects from the conductor 69 the central portions of the wave pulses corresponding to the channel concerned, but the delay network 41 should be adjusted to produce a slightly greater delay than the network 42 for a reason to be explained later. The filter 48 should be tuned to 3 megacycles per second and supplies the selected wave pulses to the modulator 50 through a new element, namely a delay network 97. It also supplies the wave pulses to a frequency discriminator 98 producing a train of amplitude modulated pulses in conventional manner, the original signal wave being recovered from the pulses by a low pass filter 99 in the usual way. The signal wave so recovered is applied to frequency modulate a local oscillator 100 which generates waves having a mean frequency of 2 megacycles per second for example. Any convenient frequent could be used for this oscillator. The frequency modulated waves from the output of the oscillator 100 are applied to the gating circuit 45 controlled by the gating pulses from the generator 43. The filter 47 at the output of the gating circuit 45 should be tuned to 2 megacycles per second.

A certain amount of delay will be introduced by the elements 98, 99 and 100 so that the portions of the frequency modulated wave at the output of the oscillator 100 corresponding to the 2 microsecond portions selected by the gating circuit 46 from the received wave pulses occur some microseconds later. Therefore it is necessary to adjust the delay network 41 so that the gating circuit 45 selects portions from the output of the oscillator 100 which properly correspond to the received wave pulses. Likewise the delay network 97 should be adjusted so that the corresponding wave pulses arrive simultaneously at the modulators 49 and 50.

The depth of frequency modulation of the oscillator 100 should be adjusted so that the frequency deviation of the wave pulses applied to the modulator 49 is an exact integral submultiple of the frequency deviation of the wave packets applied to the modulator 50, and so that the correspoding phase shift is unambiguous. A submultiple such as one tenth would be suitable, in which case the frequencies of the wave packets respectively selected by the filters 59 and 60 should be in the ratio of 1 to 10, in order that the envelope phase shifts may be the same.

Frequencies of 50 and 500 kilocycles are suitable, in which case the filter 52 can conveniently be designed to select the fifth harmonic from the harmonic generator 51 as before, and can supply it direct to the modulator 49, so that the frequency multiplier 53 shown in Fig. 5 is not required. The frequency multiplier 54 should in this case be designed to multiply by ten.

With the frequencies suggested above, the filters 55 and 56 should be tuned to 1.95 and 2.5 megacycles per second, respectively, and should both be designed to introduce a delay of 100 microseconds. Then the filters 59 and 60 should be tuned to 50 and 500 kilocycles per second respectively. These filters should preferably be designed to elongate the wave packets to a duration of at least 20 microseconds.

The pulses of the comb produced by the pulse generator 64 should be very short, say 0.02 microsecond, while it is necessary that the pulses of the other comb produced by the generator 62 should be much longer, say 0.2 microsecond, in order that the high noise which they bear should not be transferred to the pulses at the output of the coincidence circuit 66, as already explained.

It should be pointed out that by use of the method of Fig. 8, both indices now represent the same function of the signal, and so the source of distortion inherent in the method of Fig. 5 as modified by Fig. 7 is avoided. It should be noted that the phase of each wave packet at the output of the filter 59 or 60 of Fig. 8 will be proportional to the phase difference of successive received wave pulses, and this will be approximately proportional to the signal amplitude integrated over the 100 microseconds sampling period. This is also approximately true of the arrangement of Fig. 5 as modified by Fig. 7. Thus if the position modulated pulses at the output of the coincidence circuit 66 are demodulated by a conventional pulse demodulator, the integral of the signal wave will be produced, and so the recovered wave should be differentiated to reproduce the original signal wave correctly. However as explained in the specification of co-pending application of Charles William Earp, Serial No. 257,807, filed November 23, 1951, the preferred form of the demodulator 67 (Fig. 5 or 8) consists of a filter for selecting a harmonic of the output pulse repetition frequency, and a frequency discriminator to which the harmonic is applied. In this case since the output pulses are position modulated, the discriminator will produce the differential of the position modulating signal; and so no extra differentiating circuit will be required.

All the embodiments of the invention described so far have been designed for use in pulsed frequency modulation systems. Similar receiving principles can be applied to a time division phase modulation system described in the specification of co-pending application of Charles William Earp, Serial No. 257,807, filed November 23, 1951 already referred to.

Figure 9:
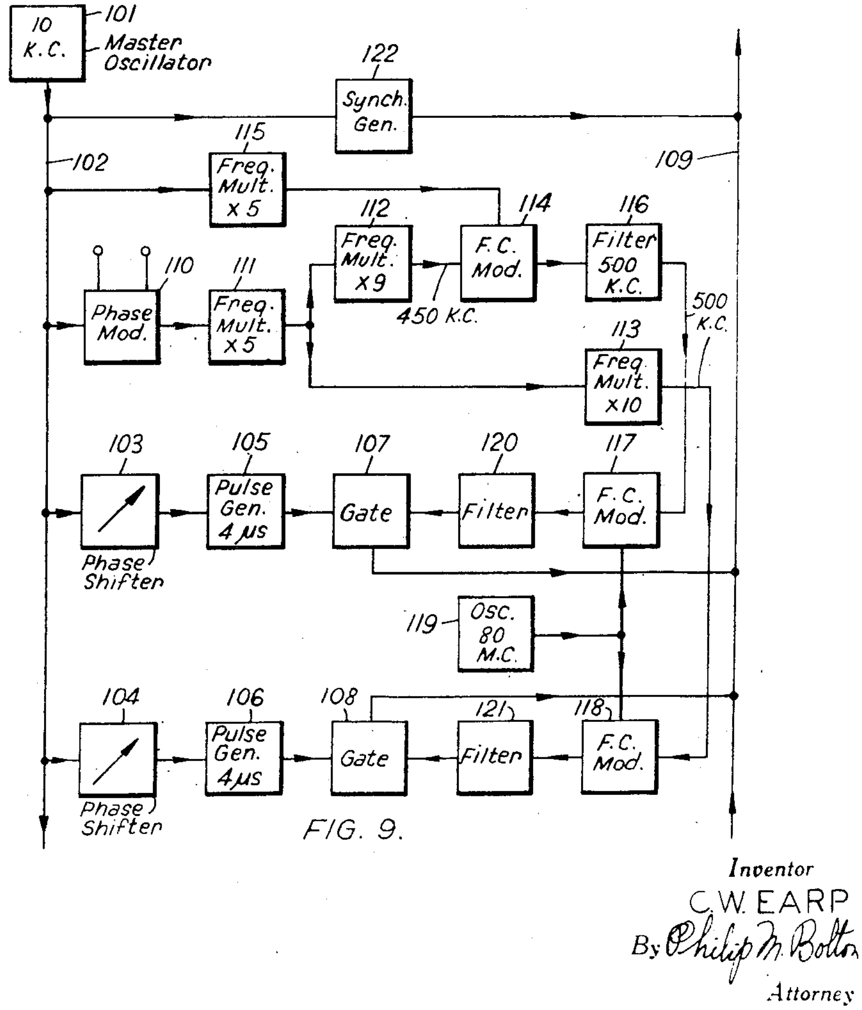
Fig. 9 shows a block schematic circuit diagram of a transmitter for a pulsed phase modulation system.

The transmitting circuit of this system (to which no claim is made in the present specification) is shown in Fig. 9, which shows the apparatus for one channel only. As before, a 12 channel system will be assumed with a sampling period of 100 microseconds divided into 12 channel periods of 8 microseconds each, and a synchronising period of 4 microseconds. Each channel period is divided into two index periods of 4 microseconds each.

In Fig. 9, a master oscillator 101 generates sine waves at 10 kilocycles per second, and supplies them over conductor 102 and through two adjustable phase shifters 103 and 104 to two gating pulse generators 105 and 106 designed to produce gating pulses of 4 microseconds duration. These supply the gating pulses to two gating circuits 107 and 108 which deliver short index trains of phase modulated waves to the output conductor 109 and thence to a radio transmitter (not shown), in a manner to be explained later. The channel modulating signal is applied to a conventional phase modulator 110 supplied with waves from the oscillator 101. This phase modulator is connected to a frequency multiplier 111 which multiplies by 5 and which in turn is connected to two further frequency multipliers 112 and 113 which multiply respectively by 9 and 10. The waves at the output of the multiplier 112, which have a frequency of 450 kilocycles per second, are applied to a frequency changing modulator 114 which is also supplied with waves at 50 kilocycles per second obtained from the master oscillator 101 by means of a frequency multiplier 115. The upper sideband at 500 kilocycles per second is selected from the modulator 115 by the filter 116. Thus at the outputs of the elements 113 and 116 we have phase modulated continuous waves of the same frequency, namely, 500 kilocycles per second, but the phase modulations are in the ratio 9:10. These two waves are supplied respectively to two further frequency changing modulators 117 and 118 supplied from a high frequency oscillator 119 generating a frequency such as 80 megacycles per second, suitable for final radiation. Sidebands of frequencies 80.5 megacycles are selected by the filters 120 and 121 and are supplied to the gating circuits 107 and 108 and thence direct to the output conductor 109. The gating pulses produced by the pulse generators 105 and 106 should be adjusted side-by-side by means of the phase shifters 103 and 104 so as just to fill the corresponding channel period of 8 microseconds.

For each channel of the system the elements referred to may all be duplicated except the master oscillator 101; if desired, also elements 115 and 119 could be common to some or all of the channels. For each channel, of course, the phase shifters 103 and 104 will be adjusted to locate the two gating pulses in the corresponding channel period.

It will be seen, therefore, that substantially a continuous wave will be radiated for 96 microseconds of each sampling period, with a 4 microseconds gap at the beginning of each such period.

This gap may be used for synchronising the receiver by supplying the wave to a detector which will produce a 4 microsecond pulse in response to each gap. Alternatively, if desired, a synchronising generator 122 may be connected between the conductors 2 and 4, and may be designed to deliver a pulse or packet of waves of a suitable distinguishable frequency under the control of the waves from the master oscillator 101. Any known device may be used to produce this effect.

It will be evident to those skilled in the art, that the frequency changing stages comprising the elements 117 to 121 (inclusive) could be omitted, and the elements 116 and 113 could be connected directly to the gating circuits 107 and 108, respectively, if it is convenient to transmit a frequency of the order of 500 kilocycles per second directly, for example over a coaxial cable (not shown).

It should be pointed out that if it is desired to employ more than two indices, the elements 112, 114 and 116 may be duplicated for each extra index. For example, the frequency multiplier (not shown) corresponding to 112 could be designed to multiply by 11, producing an output phase modulated wave of frequency 550 kilocycles per second. The frequency multiplier 115 could also supply the additional modulator (not shown) corresponding to 114, and the additional filter (also not shown) corresponding to 116 would then be designed to select the lower sideband at 500 kilocycles. In other selections of frequency the multiplier 115 would also have to be duplicated. Clearly, also, an extra gating circuit (not shown) would be needed for the additional index.

It should be pointed out that with this arrangement, all the index wave packets have the same frequency, but different envelope time shifts. In accordance with the principles already explained, these envelope time shifts must be equalised in the receiver by appropriate frequency changes.

Figure 10:
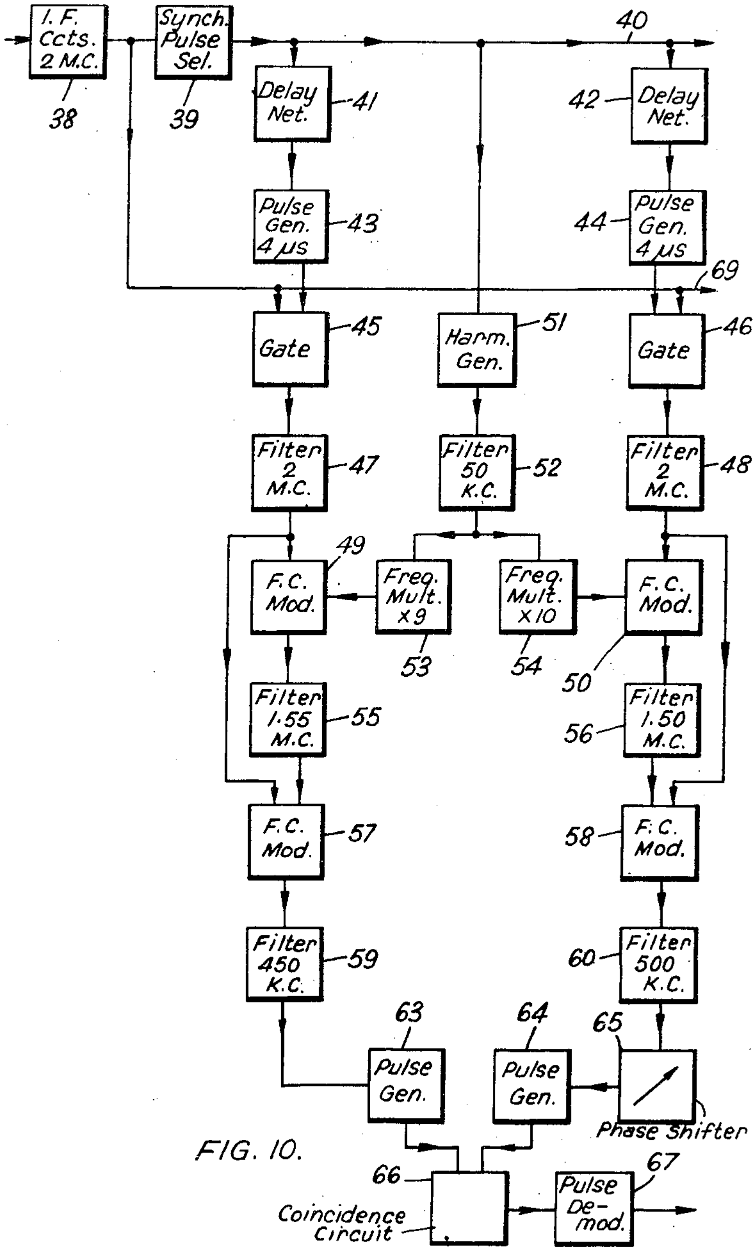
Fig. 10 shows a block schematic circuit diagram of a receiver according to the invention for the system of Fig. 9.

At the receiving end the arrangement shown in Fig. 10 can be used. This differs only slightly from Fig. 5. The delay network 70 is omitted, and the modulator 58 is supplied from the output of the filter 48 instead of from 47.

The only other difference is in the choice of values and the elements are all given the same designation numbers as in Fig. 5. Fig. 10 includes the apparatus for one two-index channel only. Only the intermediate frequency circuits (2 megacycles per second) of the receiver are shown at 38. The intermediate frequency waves are supplied to a synchronising pulse separator 39 designed to produce pulses from the gaps mentioned above in some appropriate way. The separated pulses are supplied to a gating system comprising elements 41 to 46 arranged exactly in the same way as shown in Fig. 5. The duration of the gating pulses produced by the generators 43 and 44 should preferably be somewhat less than 4 microseconds and they should be timed by means of the delay networks 41 and 42 to select the central portions of the corresponding groups of phase modulated waves. These groups are passed through relatively narrow band filters 47 and 48 tuned to 2 megacycles per second, to the frequency changing modulators 49 and 50, which are in this case respectively supplied with waves at 450 and 500 kilocycles per second from the frequency multipliers 53 and 54, which in this case multiply by 9 and 10, respectively.

The lower sidebands at 1.55 and 1.50 megacycles per second are respectively selected from the modulators 49 and 50 by the band pass filters 55 and 56, and are respectively supplied to the second pair of frequency changing modulators 57 and 58 also supplied from the filters 47 and 48. The lower sidebands at frequencies 450 and 500 kilocycles per second are respectively selected by the filters 59 and 60.

The filters 55 and 56 should in this case be designed to introduce a delay of 100 microseconds.

As previously described, pulse combs are produced from the phase modulated wave packets at the outputs of the filters 59 and 60 by means of the pulse generators 63 and 64, a phase shifter 65 being interposed between elements 60 and 64 to enable the two combs to be relatively timed to produce the coincidence near the centre of each comb when the modulating signal voltage is zero. The two combs are applied to the coincidence circuit 66 and demodulated by a suitable demodulator 67 as before.

When three or more indices are used, the left-hand chain of elements 41 to 63 in Fig. 10 should be duplicated for each additional digit. In the case of the three-index system suggested above, an additional frequency multiplier (not shown) corresponding to 53 and multiplying by 11, would be needed to supply the modulator (not shown) corresponding to 49, and the filter (also not shown) corresponding to 55 would be designed to select the lower sideband at 1.45 megacycles, introducing at the same time a delay of 100 microseconds. The filter (not shown) corresponding to 59 should then select the sideband at 550 kilocycles. The three pulse combs subsequently produced in the manner already explained will then be applied to the element 66 which in this case should be a triple coincidence circuit. By the use of this system of frequency changes, the envelope time shifts are equalised, as required.

It will be seen that in the arrangement of Fig. 10, the wave packets at the output of the filter 59 have a phase equal to the difference between the phases of the two successive index wave packets, and the same is true of the wave packets at the output of the filter 60. Thus the time shifts of the output pulses produces by the coincidence circuit 66 will be proportional to the difference between successive signal amplitude samples, and so if a conventional demodulator 67 is used, the output must be passed through an integrating circuit in order to recover the signal wave. If a demodulator containing a frequency discriminator is used, a further differentiation will be produced, as described with reference to Fig. 8, and so two integrating stages would then be necessary.

It will be observed that all the receivers which have been described with reference to Figs. 4, 5, 7, 8 and 10 have a common feature which is this, that two differently phased samples of a phase or frequency modulated wave are taken and are then combined together to yield a derived wave the phase of which is determined by the phase difference of the two samples. This is therefore the characteristic feature of the present invention.

It has already been stated that the coincidence technique employed in the embodiments of the present invention is claimed in the specification of copending application of Charles William Earp, Serial No. 257,808, filed November 23, 1951. No claim is therefore made in the present specification to this technique except when employed in conjunction with an arrangement in which wave trains are selected from the received wave pulses, and are combined in pairs to produce wave packets each having a phase determined by the phase difference of a corresponding pair of wave trains.

While the principles of the invention have been described above in connection with specific embodiments and particular modifications thereof, it is to be clearly understood that this description is made only by way of example and not as a limitation on the scope of the invention.

What is claimed is:

1. A receiving arrangement for an electric communication system of the kind in which a signal wave is periodically sampled and in which each signal sample is represented by at least one transmitted train of waves, the frequency of which indicates the amplitude of the signal sample, comprising means for producing two sets of two differently phased wave trains at least one set from each transmitted wave train, means for combining the two trains of each set to produce an additional train of waves corresponding to each set and having a phase which varies in accordance with the difference between the phases of the waves of the respective combined trains, and means responsive to the resulting two additional trains of waves to reproduce the original signal wave.

2. A receiving arrangement for an electric communication system providing one or more signal channels of the kind in which, in each channel, a signal wave is periodically sampled, and in which each signal sample is represented by a corresponding transmitted wave train of constant frequency waves having a given duration, the relative phase and frequency of which are both determined solely by the magnitude of the signal sample, comprising means for selecting each received wave train, means for obtaining from the selected wave train a derived wave train delayed thereafter by a time less than the given duration, means for combining the selected and derived wave trains in order to yield a first additional wave train having a phase determined by the difference between the phases of the selected and derived wave trains, separate means for selecting a portion of each received wave train in order to produce a secondary wave train, means for combining two secondary wave trains derived respectively from the selected wave pulse, and from the previous wave pulse, in order to yield a second additional wave train having a phase determined by the difference between the phases of the respective combined secondary wave trains, and means controlled jointly by the first and second additional wave trains for reproducing a sample of the signal wave.

3. A receiving arrangement for an electric communication system providing one or more signal channels of the kind in which, in each channel, a signal wave is periodically sampled, and in which each signal sample is represented by a corresponding transmitted wave train whose frequency depends on the magnitude of the sample, comprising means for selecting two separate wave train portions from each transmitted wave train, means for combining a pair of wave train portions, one from each of two successive wave pulses, in order to yield a first additional wave train having a phase determined by the difference between the respective phases of the said pair of wave train portions, means for combining another pair of wave train portions, one from each of the same two wave pulses, in order to yield a second additional wave train having a phase determined by the difference between the respective phases of the last mentioned pair of wave train portions, the phases of the first and second additional wave trains being different, and means controlled jointly by the said first and second additional wave trains for reproducing a sample of the signal wave.

4. A receiving arrangement for an electric multichannel pulsed frequency modulation system of the kind in which a separate frequency modulated oscillator is provided for each channel, comprising, in each channel, means for selecting a primary wave train portion from each received frequency modulated wave train, means for demodulating the selected portions in order to recover the corresponding channel signal wave, means for applying the recovered signal wave to frequency-modulate a local oscillator, means for selecting from the output of the local oscillator a secondary wave train portion corresponding to each of the primary portions selected from the received wave pulses, the depth of frequency modulation being so adjusted that the frequency deviation in each secondary wave train is less than the frequency deviation of the corresponding primary wave train, means for combining two primary wave trains derived respectively from successive wave pulses in order to yield a first additional wave train having a phase determined by the difference between the respective phases of the combined primary wave trains, means for combining the two secondary wave trains corresponding respectively to the said two primary wave trains in order to yield a second additional wave train having a phase determined by the difference between the respective phases of the combined secondary wave trains, and means jointly controlled by the first and second additional wave trains for reproducing a sample of the said channel signal wave.

5. A receiving arrangement for an electric communication system providing one or more signal channels of the kind in which in each channel the signal wave is periodically sampled, and in which each signal sample is represented by two or more transmitted index wave trains of phase modulated waves, the waves of all such trains having different phase shifts, comprising, for each channel, means for separately selecting each received index wave train corresponding to a given signal sample, means corresponding to each index for combining two successive wave trains of that index in order to yield an additional wave train having a phase determined by the difference between the respective phases of the combined wave trains, and means jointly controlled by similar additional wave trains corresponding to the respective indices for reproducing a sample of the channel signal wave.

6. A receiving arrangement for an electric communication system providing one or more signal channels of the kind in which, in each channel, a signal wave is periodically sampled, and in which each signal sample is represented by a corresponding transmitted wave train whose frequency depends on the magnitude of the sample, comprising means for selecting two separate wave train portions from each transmitted wave train, means for combining a late portion of one wave train with a late portion of the succeeding wave train in order to yield a first additional wave train having a phase determined by the difference between the respective phases of the wave train portions so combined, means for combining a late portion of one wave train with an early portion of the succeeding wave train in order to yield a second additional wave train having a phase determined by the difference between the respective phases of the two last-mentioned wave train portions, the phases of the first and second additional wave trains being different, and means controlled jointly by the said first and second additional wave trains for reproducing a sample of the signal wave.

7. A receiving arrangement for an electric communication system providing one or more signal channels of the kind in which, in each channel, a signal wave is periodically sampled, and in which each signal sample is represented by a corresponding transmitted wave train whose frequency depends on the magnitude of the sample, comprising means for selecting two separate wave train portions from each transmitted wave train, means for combining an early portion of one wave train with a late portion of the succeeding wave train in order to yield a first additional wave train having a phase determined by the difference between the respective phases of the wave train portions so combined, means for combining a late portion of one wave train with an early portion of the succeeding wave train in order to yield a second additional wave train having a phase determined by the difference between the respective phases of the two last-mentioned wave train portions, the phases of the first and second additional wave trains being different, and means controlled jointly by the said first and second additional wave trains for reproducing a sample of the signal wave.

8. A receiver according to claim 2 in which the means for reproducing the sample of the signal wave comprises means for deriving from each additional wave train a corresponding comb of pulses having the same repetition period as that of the waves of said additional wave train, and means for applying all the combs to a coincidence circuit designed to produce an output pulse only in response to the simultaneous receipt of one pulse from each comb.

9. A receiver according to claim 8 comprising means for equalising the envelope time shifts of the wave trains before deriving the corresponding pulse combs.

10. A receiver according to claim 8 comprising means including a frequency discriminator for demodulating the output pulses corresponding to successive samples of the signal wave in order to recover the said signal wave.

11. A receiving arrangement according to claim 1 in which the means for combining two wave trains comprises a first frequency changing modulator, a source of a heterodyne wave having a given frequency, means for applying the first wave train and the heterodyne wave to the modulator, means for selecting and delaying a given sideband from the output of the modulator, means for applying the delayed sideband together with the second wave train to a second frequency changing modulator, and means for selecting from the second modulator a sideband having the given frequency.

12. A receiving arrangement according to claim 11 for a multichannel communication system having means for transmitting periodic synchronising signals with the wave pulses, comprising means for selecting a harmonic of the repetition frequency of the periodic signals to serve as the said heterodyne wave.

13. A receiving arrangement according to claim 12 including a frequency multiplier, means for passing said harmonic to the input of the frequency multiplier, and means for passing the output of said frequency multiplier to the first frequency changing modulator.

References Cited in the file of this patent

UNITED STATES PATENTS

| | | |
|---|---|---|
| 2,452,547 | Chatterjea et al. | Nov. 2, 1948 |
| 2,545,464 | Hoeppner et al. | Mar. 20, 1951 |
| 2,547,001 | Grieg | Apr. 3, 1951 |